US010846347B2

United States Patent
Staub et al.

(10) Patent No.: US 10,846,347 B2
(45) Date of Patent: Nov. 24, 2020

(54) YOUTH SPORTS PROGRAM CATALOGING AND RATING SYSTEM

(71) Applicant: Tipevo, LLC, Ridgefield, CT (US)

(72) Inventors: David Staub, Groton, CT (US); Dan Conte, Ridgefield, CT (US); Armando Braun, Brooklyn, NY (US)

(73) Assignee: Tipevo, LLC, Ridgefield, CT (US)

(*) Notice: Subject to any disclaimer, the term of this patent is extended or adjusted under 35 U.S.C. 154(b) by 209 days.

(21) Appl. No.: 15/836,471

(22) Filed: Dec. 8, 2017

(65) Prior Publication Data

US 2018/0165365 A1 Jun. 14, 2018

Related U.S. Application Data

(60) Provisional application No. 62/431,648, filed on Dec. 8, 2016.

(51) Int. Cl.
| | | |
|---|---|---|
| *G06F 16/00* | (2019.01) | |
| *G06F 16/951* | (2019.01) | |
| *A63B 71/06* | (2006.01) | |
| *G06F 16/28* | (2019.01) | |
| *G06F 16/958* | (2019.01) | |
| *G06F 16/2457* | (2019.01) | |
| *G06Q 50/20* | (2012.01) | |
| *G06Q 10/10* | (2012.01) | |
| *G06Q 30/06* | (2012.01) | |

(52) U.S. Cl.
CPC ........ *G06F 16/951* (2019.01); *A63B 71/0616* (2013.01); *G06F 16/24578* (2019.01); *G06F 16/287* (2019.01); *G06F 16/958* (2019.01); *G06Q 10/10* (2013.01); *G06Q 30/0631* (2013.01); *G06Q 50/205* (2013.01)

(58) Field of Classification Search
None
See application file for complete search history.

(56) References Cited

U.S. PATENT DOCUMENTS

| | | | |
|---|---|---|---|
| 7,636,677 B1 * | 12/2009 | McGonigal | G06Q 30/02 705/26.7 |
| 8,984,049 B1 * | 3/2015 | Rekhi | G06F 16/84 709/203 |
| 9,836,798 B2 | 12/2017 | White et al. | |

(Continued)

FOREIGN PATENT DOCUMENTS

WO WO-2005010675 A2 * 2/2005 ............ G06Q 10/04

*Primary Examiner* — Bai D Vu
(74) *Attorney, Agent, or Firm* — Getz Balich LLC

(57) ABSTRACT

According to a first aspect of the present disclosure, a method of cataloging youth sports is provided that includes: collecting youth sports data, which collecting includes automated electronic searching of the Internet for the youth sports data, and storing the collected youth sports data in at least one data storage device; classifying the collected youth sports data, which classifying includes filtering and analyzing the collected data, and populating portions of the collected data into one or more predetermined candidate profiles; evaluating the one or more candidate profiles relative to a threshold, wherein each of the one or more candidate profiles that satisfy the threshold are identified as a validated profile; and publishing the one or more validated profiles in a web-based application accessible over the Internet.

20 Claims, 15 Drawing Sheets

(56) References Cited

U.S. PATENT DOCUMENTS

| | | | |
|---|---|---|---|
| 2010/0058168 A1* | 3/2010 | Gibb | G06F 16/9535 |
| | | | 715/234 |
| 2010/0058177 A1* | 3/2010 | Engel | G06F 17/277 |
| | | | 715/256 |
| 2013/0173568 A1* | 7/2013 | Josifovski | G06F 16/951 |
| | | | 707/706 |
| 2016/0342699 A1* | 11/2016 | Shen | G06Q 30/0269 |
| 2017/0259115 A1* | 9/2017 | Hall | A61B 5/0024 |

* cited by examiner

Focus

We represent a program's approach with three different grades: Fun, Development, and Competitive.

Those grades take into account many factors like available levels for you to play, roster turn-over, and parent's feedback so you can understand what a program is about in just a glimpse.

  

For example, a perfectly balanced program, with enough Fun, Developmental, and Competitive alternatives for young players would look like this:

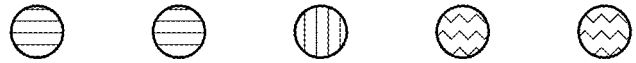

Lot's of Fun, with a degree of Developmental:

Some Developmental alternatives, but mostly Competitive:

*FIG. 3*

PROFILE REVIEW

Tom D
The facilities at FSA are great!

22.11.17                                                    *Unverified*

Tom D
My kids have been a part of FSA for the last two years and they really enjoy it. I recommend it.

23.11.17                                                    *Unverified*

Tom D
The coaches at FSA are nice and I would recommend them.

24.11.17                                                    *Unverified*

*FIG. 4*

Flag a Review?

Choose an option and we will take action if necessary

- Bad Behavior
- Seems like SPAM
- Another

*FIG. 5*

PROGRAM COACH LEVELS

| Tipevo Coach Rating System Level | Coach Qualification Parameters |
|---|---|
| Q1 | Minimum age of 18 required. No other qualifications |
| Q2 | Minimum age of 21 / Medical Certification (CPR) / Coaching Experience (minimum 1 year) / Background Check / Sport-Specific Certification |
| Q3 | Minimum age of 21 / Medical Certification (CPR) / Coaching Experience (minimum 3 years) / Playing Experience (High School Level) / Background Check / Sport-Specific Certification |
| Q4 | Minimum age of 25 / Medical Certification (CPR) / Coaching Experience (minimum 5 years) / Playing Experience (HighSchool or Collegiate Level) / Background Check / Sport-Specific Certification / Advocacy Group Certification / Tipevo Certification (claimed coach profile) |
| Q5 | Minimum age of 30 / Medical Certification: CPR & Concussion / Coaching Experience (minimum 10 years) / Playing Experience (Collegiate or Professional Level) / Background Check / Sport-Specific Certification / Advocacy Group Certification / Tipevo Certification (claimed coach profile) / Supplemental Designation (e.g. Nutrition, Strength & Conditioning, Speed & Agility) |

YOUTH SPORTS PROGRAM CATALOGING AND RATING SYSTEM

This application claims priority to U.S. Provisional Patent App. No. 62/431,648 filed Dec. 8, 2016, which application is herein incorporated by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent and Trademark Office patent files or records, but otherwise reserves all copyright rights whatsoever. The following notice applies to the software and data described below and in the drawings that form a part of this document: Copyright 2017, Tipevo, Inc. All Rights Reserved.

BACKGROUND

This disclosure relates to digital youth sports programs systems in general, and to digital systems capable of, and methods for, categorizing youth sports programs in a standardized manner that facilitates individual program analysis and comparative program analysis in particular.

Youth sports programs (e.g., soccer, basketball, football, baseball, equestrian, swimming, golf, etc.) have historically been developed on a local basis. Each municipality may have organized youth sports programs, but the structure and goal of those programs may greatly differ. In some instances, the youth sports program may be a recreational league designed for the sole purpose of encouraging physical activity and participant enjoyment. In other instances, the youth sports program may have multiple tiers; e.g., "fun" recreational levels open to players of all skill levels, competitive development levels where player skills and competition are emphasized, and premier levels where advanced skills players are selectively accepted and travel to play remotely located similar teams. Yet, there are often significant organizational and/or operational differences in the various programs that make it difficult if not impossible to compare programs. There are regional and sometimes national governing bodies, but these governing bodies interact with the organizers of the programs and program end-users such as players and their families in many various and inconsistent degrees.

In addition to the significant organizational and/or operational differences in the various programs, there is also little consistency in the manner in which these programs provide information to their end-users; e.g., communicating cost, time commitment required to participate, the skill level at which a participant will be expected to perform, etc. The lack of information standardization, disparate information sources, unreliable timeliness of information disclosure, and in many instances questionable integrity of program information make it difficult at best for an end-user to determine what youth sports programs are available, meaningful information about a program, and/or to comparatively review different youth sports programs. In fact, the lack of program data standardization often makes the data that is available difficult to understand. For example, few youth sports programs provide complete, accurate, and/or current information of their program, or definitions of what their program offers; e.g., what makes one level of program participation (e.g., "travel" level) different from another level of program participation (e.g., "premier" level). Hence, there is very often a lack of transparency. In addition to the lack of transparency, there is also very often no standardization between programs; e.g., what one youth sports program refers to as a "recreation" level program, another youth sports program might refer to a "intramural" level program. Regional differences (e.g., state to state, East Coast vs Midwest vs West Coast) in terminology can further exacerbate the issue. Hence, players and/or parents seeking to evaluate potential youth sports programs (in or outside their region) currently have very little information readily at their disposal, and the information that is available may be inconsistent. A family seeking to relocate to a new region will often be in the dark regarding what youth sports programs are available in the new region.

Hence, what is needed is a system and method for providing information relating to youth sports that is standardized, unbiased, reliable, accurate, and current, and one that facilitates individual program analysis, as well as comparative program analysis, in a manner that is beneficial to both the youth sports program providers and the end-users, regardless of whether a user is looking at single sport, or across multiple sport.

SUMMARY

According to a first aspect of the present disclosure, a method of cataloging youth sports is provided that includes: collecting youth sports data, which collecting includes automated electronic searching of the Internet for the youth sports data, and storing the collected youth sports data in at least one data storage device; classifying the collected youth sports data, which classifying includes filtering and analyzing the collected data, and populating portions of the collected data into one or more predetermined candidate profiles; evaluating the one or more candidate profiles relative to a threshold, wherein each of the one or more candidate profiles that satisfy the threshold are identified as a validated profile; and publishing the one or more validated profiles in a web-based application accessible over the Internet.

According to another aspect of the present disclosure, a machine-readable data storage device that stores a set of instructions in a non-transitory manner, when executed by a machine, cause execution of operations is provided. The operations include: classifying collected youth sports data stored in at least one data storage device, at least a portion of the collected youth sports data electronically collected from the Internet, wherein the classifying includes filtering and analyzing the collected data, and populating portions of the collected data into one or more predetermined candidate profiles; evaluating the one or more candidate profiles relative to a threshold, wherein each of the one or more candidate profiles that satisfy the threshold are identified as a validated profile; and publishing the one or more validated profiles in a web-based application accessible over the Internet.

According to another aspect of the present disclosure, a method of cataloging youth sports is provided. The method includes: collecting youth sports data, which collecting includes automated electronic searching of the Internet for the youth sports data, and storing the collected youth sports data in at least one data storage device; and using at least one processor to execute instructions stored in at least one memory device, which instructions cause the processor to: classify the collected youth sports data, which classifying includes filtering and analyzing the collected data, and populating portions of the collected data into one or more predetermined candidate profiles; evaluate the one or more candidate profiles relative to a threshold, wherein each of the one or more candidate profiles that satisfy the threshold are identified as a validated profile; and publish the one or more validated profiles in a web-based application accessible over the Internet.

DETAILED DESCRIPTION OF THE DRAWINGS

FIG. 3 is a fun/skill development/competition emphasis module legend.

FIG. 4 is a review module display box embodiment.

FIG. 5 is a flag information box embodiment.

FIG. 6 is an embodiment of a coach level menu.

FIG. 7 is an Identity page embodiment of a youth sports program profile in an editing mode.

FIG. 8 is a Location page embodiment of a youth sports program profile in an editing mode.

FIG. 14 is an example embodiment of a profile summary page.

DETAILED DESCRIPTION

The present disclosure includes systems and methodologies (referred to hereinafter as the "present system") for cataloging youth sports programs (e.g., in a manner that allows for standardization, program analysis, comparative program analysis, etc.). The present disclosure is applicable to a wide variety of youth sports programs including soccer, basketball, football, baseball, equestrian, swimming, golf, etc. These are non-limiting examples of youth sports programs that can be utilized within the present disclosure. The term "youth sports program" as used herein refers to a tangible, existing structure that directly organizes a plurality of teams playing games, matches, or the like at one or more predefined locations (as opposed to a sport administrative body), in which a player in the age range of four to nineteen years of age (4-19 yrs) may participate. The present system defines a youth sports programs by the presence of certain predefined criteria (e.g., sport, facilities, program administrator, coach, etc.) that may be discoverable on the Internet. In some instances, a youth sports program may be independent of a school system (e.g., a town league, a private league, etc.). In some instances, a youth sports program may be associated with a municipal or private school system (e.g., freshman, junior varsity, and varsity teams for a given sport).

Figure 1:
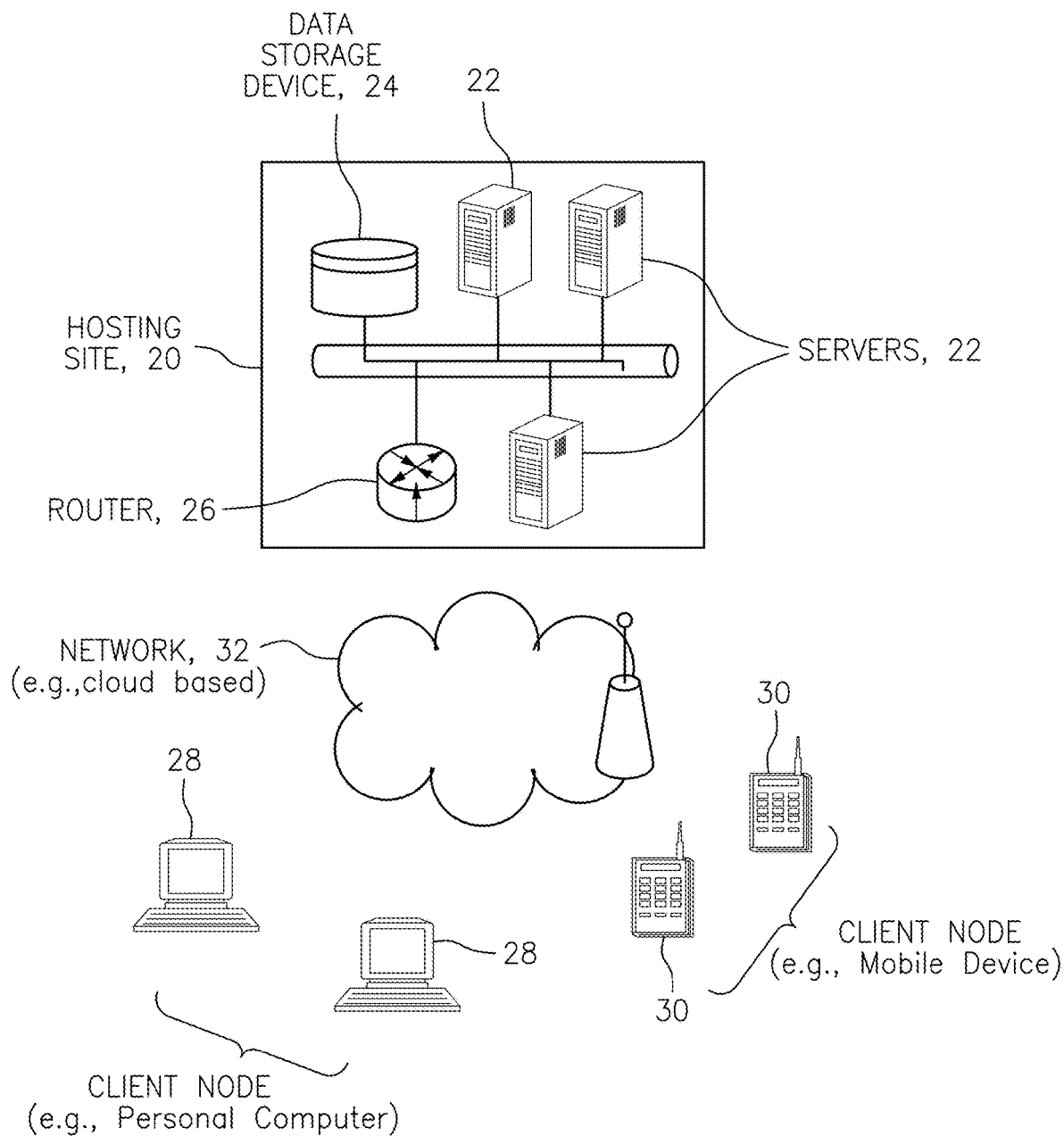
FIG. 1 is a diagrammatic representation of a network environment in which the system may be operated.

FIG. 1 illustrates an exemplary, non-limiting network environment in which the present system can operate. The network environment includes at least one network application hosting site 20 connected to client nodes 28, 30 via a network cloud 32 that may include packet-based wide area networks (such as the Internet), private networks, wireless networks, satellite networks, cellular networks, paging networks, and the like. Client nodes 28, 30 are operably connected to the network environment via a network service provider or any other suitable means. The term "client node" as used herein refers to a computer or computing device including functionality for communicating over a computer network. A client node can be a computer 28 or a mobile device 30, such as a cellular telephone, tablet, personal digital assistants, or the like. A client node may execute one or more client applications, such as a web browser, to access and view system content over a computer network. The network application hosting site 20 is a network addressable system (that hosts the present system) that is accessible to end-users over a computer network. The network application hosting site 20 may include one or more servers 22 and one or more data storage devices 24. The one or more servers 22 may be operably connected to computer network 32 via a router 26. The one or more servers 22 and the one or more data storage devices 26 may be located at a particular network application hosting site 20 location, or may be located as disparate locations but in communication with one another.

The servers and data storage devices may be implemented in digital electronic circuitry, or in computer hardware, firmware, software, or in any combination thereof. The servers and data storage devices may include memory that includes a single memory device or a plurality of memory devices. A memory device can include a storage area network, network attached storage, as well as one or more dedicated hard disk drives or other disk drives, a read-only memory, random access memory, volatile memory, non-volatile memory, static memory, dynamic memory, flash memory, cache memory, and/or any device that stores digital information. The servers and data storage devices may include one or more processing units configured to execute instructions to perform the functionality described herein. A processing unit may include any type of computing device, computational circuit, or any type of process or processing circuit capable of executing instructions that are stored in memory and/or input; e.g., a microprocessor, co-processors, a micro-controller, digital signal processor, microcomputer, central processing unit (CPU), field programmable gate array, programmable logic device, state machine, logic circuitry, analog circuitry, digital circuitry, and/or any device that manipulates signals (analog and/or digital) based on operational instructions that are stored in a memory. When a processing unit implements one or more of its functions, the memory storing the corresponding operational instructions may be embedded within, or external to, the circuitry comprising the state machine, analog circuitry, digital circuitry, and/or logic circuitry.

The servers and data storage devices of a network environment in which the present system can operate may be located at a single site or distributed across multiple sites and interconnected by a communication network. For example, a first portion of a network environment in which the present system can operate utilized in a data collection function (described below) may be independent of but in communication with a second portion of the network environment utilized in a data analysis function (described below), which second portion is in turn in communication with a third portion of the network environment that can be accessed by end-users, each of which portion may have one or more servers and data storage devices. The present disclosure is not limited to any particular network environment configuration.

The instructions to perform the functionality described herein may be in the form of, but are not required to be in the form of, a computer program. A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

Embodiments of the present system include collecting data relating to youth sports (e.g., youth sports programs, facilities, coaches, teams, performance, desirability, etc.) from a variety of different sources. To facilitate the description herein, the present system will be described in terms of a youth sports programs unless otherwise specified, but is not limited thereto; i.e., as stated above, the present system may be utilized to analyze, organize, and present information pertaining to a variety of different aspects of youth sports. Collecting the data from a variety of different sources enhances the ability to provide complete and verifiable data. In regards to "verifiable" data, collecting the data from a variety of different sources may produce independent data layers, each of which may be collected from a difference source. Data collected from independent sources increases the integrity of the collected data. The data search process may include a plurality of different searching techniques, including the use of automated web search engines (e.g., Google, Microsoft Bing, etc.; other non-limiting examples are disclosed in U.S. Pat. Nos. 9,785,681 and 9,063,984, both of which are hereby incorporated by reference in their entirety) and manual searches, and combinations thereof. To guide the searching process, analyses pertaining to characteristics of the particular youth sport type under consideration may be performed to better focus the searching. The aforesaid analyses may include the identification of meaningful search terms (e.g., nomenclature, keywords, acronyms, URLs, addresses, etc.) relating to a particular youth sport type under consideration. The searches may access a variety of different data sources (preferably electronic data sources); e.g., the Internet, literature libraries, news media libraries, metadata sources, etc. There are numerous automated searching tools available, and the present disclosure is not limited to using any particular searching tool. In fact since automated searching tools typically operate on proprietary algorithms, it is preferable to utilize more than one automated search tool during data collection to increase the yield of data collected. In some instances, initially structured search criteria (e.g., based on keywords, rules, etc.) can be edited and/or further developed using machine learning techniques to enhance the productivity, accuracy, and yield of the search. Data collected during the search processes may be stored in a database configured to store the collected data securely and return that data in response to requests from other software applications. A non-limiting example of a database that may be used to store the collected data is an object-relational database management system (ORDBMS). A specific example of an ORDBMS that may be used is a PostgreSQL (sometimes referred to as "Postgres") type ORDBMS.

The collected data may then be subjected to a classification process, wherein the data is classified into initial categories that may correspond to predetermined profile types (explained below) and/or into youth sports program attribute types. At least some of the profile types correspond to profiles that are produced by the system and made available to end-users of the system. Non-limiting examples of profile types include; e.g., youth sports programs, camps, clinics, coaches, facilities, teams, players, etc. Youth sports program attribute types may be selected to produce standard attributes that can be used to populate profiles (as will be explained below). These predetermined attribute types provide numerous benefits; e.g., minimization or elimination of nomenclature differences, standardization of program data, increase in the availability of program data, etc. Organizing data in this manner (and producing profiles wherein the data can be displayed, individually analyzed, and comparatively analyzed) gives the end-users of the system a dramatic and significant tool to investigate aspects of youth sports programs not only on an individual basis (e.g., investigate the attributes of a particular youth sports program), but also provides a tool for comparative analysis (e.g., compare the attributes of multiple youth sports program relative to one another). In addition, as will be explained below, the structure of the present system allows end-users to determine connections that may exist between different aspects of youth sports programs. A key aspect of the present system that enhances end-user individual analyses and comparative analyses is the system's standardization of collected data during the classification process—standardized program data allows for more meaning analyses.

The classification process used in the present system may utilize a plurality of different techniques. For example, aspects of the classification process may be rule-based, may consider program attributes, and may include one or more filtering processes. The filtering may include evaluating the collected data to determine if the data is useful or not, and collected data that is deemed to be "not useful" may be stored for later analysis or may be discarded. The initially collected data that is deemed to be "useful" may be algorithmically analyzed to discover bits of data that suggest connections or relationships within the collected information. For example, data initially collected from a variety of different sources may reflect a number of youth sports programs entitled "XYZ". Data analysis can be performed to determine if there are any links or connections between these "separate" youth sports program entitled "XYZ". The presence of links/connections may suggest they are in fact the same program, or the absence of links/connections may suggest they are independent of one another. In this manner, redundancies within the initially collected data can be eliminated. As another example, analysis of the collected data may discover youth sports programs that are referred to by different names. Here again, data analysis can be performed to determine if there are any data linking these independently named youth sports program, suggesting they are in fact the same program, or if they are independent programs. Still further, it is not uncommon for collected data to include multiple, different data points (e.g., addresses, contact persons, URLs, etc.). The analysis may associate the different data points and make a preliminary determination regarding which of the multiple data points is most likely current and accurate (e.g., based on frequency, date, etc.). The classification software may include machine learning capability to improve the performance and yield of the analytical process. The classification software may also utilize one or more disambiguation techniques (e.g., involving the science of Natural Language Understanding (NLU)), algorithms, and tools to associate information with a particular program.

As indicated above, the present system is configured to collect and organize data in profiles that can be accessed by end-users of the system; e.g., players, player families, youth sports program officials, etc. The system includes a plurality of different templates that can be used to produce different profiles. The templates may vary depending upon factors such as the profile type (e.g., youth sports program, facility, coach, camp, team, player, scholastic, non-scholastic, etc.) and the particular type of sport involved (e.g., soccer, football, baseball, tennis, hockey, equestrian, golf, etc.). Each template is configured to contain a predetermined group of attributes that may be useful for analyses purposes as will be discussed below. Some types of attributes may be common to all templates, and other attributes may be useful in less than all templates. Non-limiting examples of attributes that may be common to all templates include the program name, the program website, the year established, the program location data, program contact information (e.g., contact person, email address, phone number, etc.), etc. Non-limiting examples of attributes that may be specific to certain profile types, include the particular sport, player gender, scholastic (e.g., having freshmen, junior varsity, and varsity levels), non-scholastic (e.g., having recreational, travel, premier, and academy levels), handicap, indoor/outdoor, etc.

The system populates related, collected data into the attribute fields within an appropriate profile template. As stated above, to facilitate the description herein the present system will be described in terms of creating a profile for a youth sports program, but is not limited thereto. The initially populated template may be referred to as a "candidate youth sports program profile". The term "candidate youth sports program profile" is used here to refer to a template populated with youth sports data that has been initially identified by the system as being associated with a prospective youth sports program, which prospective program has not yet been confirmed as a program.

The present system may then evaluate whether the candidate youth sports program profile (based on the data contained therein) should be validated or not as an actual youth sports program, or potentially validated as another profile type. The evaluation may involve determining whether a candidate youth sports program satisfies a predetermined standard, threshold, or other criteria (all of which are referred to hereinafter as a "threshold" for convenience of description). The evaluation may include determining how many attribute fields within a candidate youth sports program profile are populated, inconsistencies in attribute data, etc. The system then may assign a profile rating value (e.g., a rating score) based on the evaluation that is representative of the confidence of the system that the youth sports program candidate is in fact a currently existing, actual youth sports program. If the profile rating value is below a threshold, the system may elect to not validate the candidate program as a youth sports program. The data associated with the unconfirmed candidate program may be stored for further evaluation and/or it may be subjected to additional processing (e.g., an exception processing step as will be explained below), or it may be purged. The present system is not limited to using a "profile rating value" as a threshold for validating a candidate program.

For those candidate youth sports programs that are not validated as a program, the system may include an "exception processing step" that further evaluates collected data, and/or performs additional searching to identify the attribute data lacking in the candidate profile, and/or to clarify instances wherein conflictual collected data exists. In regards to conflictual collected data, as indicated above it is not uncommon for a youth sports program to have historically varying data (e.g., multiple different names, or URLs, locations, etc.), which varying data can create uncertainty regarding the correct data to assign to an attribute field. As part of the exception processing step, the system may perform an analysis that identifies relationships between the conflicting data, determine whether or not conflictual data does in fact apply to the same program and identify the most current data (e.g., the current program name, location, URL, contact person, etc.). As stated above, the analysis software may include machine learning capability to improve the performance of the analytical process. The candidate profile may then be updated with any additional discovered and/or clarified data. The updated candidate program profile may then be subjected to the above described evaluation process to determine if the updated candidate profile has an acceptable profile rating value; i.e., should be validated. This process of reevaluating a candidate profile may be performed at any point in time, and may be performed a plurality of times. In some embodiments, if the candidate profile processing and evaluation steps fail to produce a candidate program profile that satisfies the profile rating value threshold, it may be purged or the data stored for subsequent consideration.

In some instances, a candidate profile that has been evaluated and has satisfied the profile rating threshold may still include unfilled attribute fields (or conflicting data for an attribute field). The system may utilize a process similar to the exception processing step (or may utilize the exception processing step) to further evaluate collected data, and/or perform additional searching to identify attribute data lacking in the candidate profile. Any additional discovered or clarified data may be used to subsequently update the candidate profile.

In some embodiments, the system may include the capability to identify an image (e.g., a logo, a proprietary graphic design, etc.) associated with a youth sports program, and to search for that image as part of the data search process. There are several image recognition software packages currently available and the present system is not limited to use with any particular image recognition software. The profile templates described above may include one or more attribute fields configured to store a program image. The above-described classification process may utilize image recognition to evaluate collected images and associate them with a candidate youth sports program if possible. If the initially collected information contains redundant images initially associated with a particular youth sports program, the image recognition software can be used to eliminate redundancies, or to make a preliminary determination that a particular youth sports programs utilizes a plurality of different images (e.g., logos). In instances wherein the analysis identifies multiple images associated with a particular youth sports program, the system may make a preliminary determination regarding which of the images is most likely current and accurate (e.g., based on frequency, date, etc.).

Figure 2:
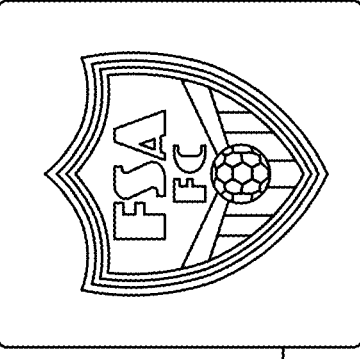
FIG. 2 is an example embodiment of a profile summary page.
Figure 14:
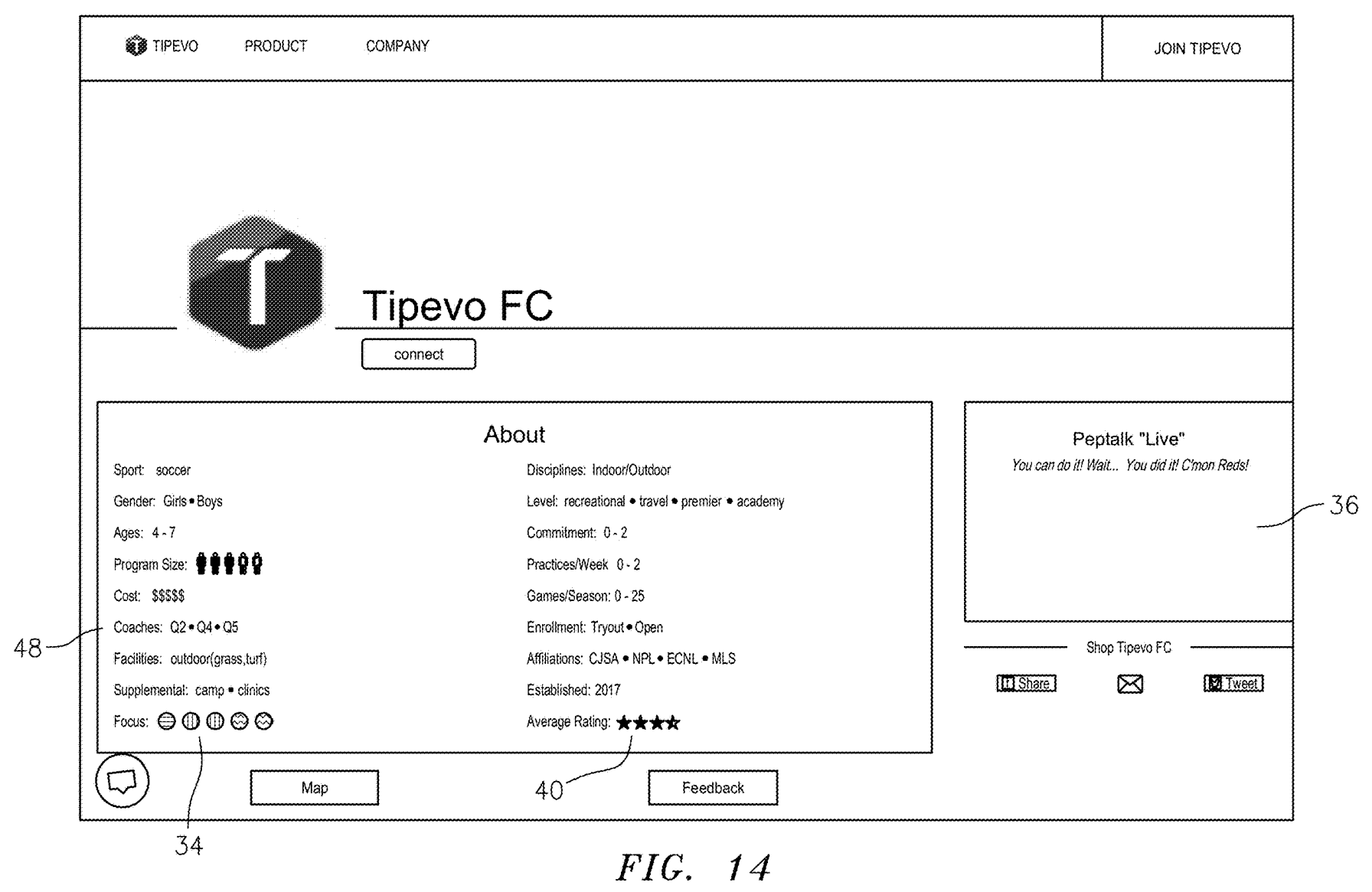

A candidate profile may include a fun/skill development/competition emphasis module that permits the system operator and certain end-users (e.g., "claimed" programs, verified players or player families, etc.) to provide input regarding the relative emphasis of fun, skill development, and competition with respect to a youth sports program, and an emphasis indicator that may be displayed on the summary page of a validated program profile (e.g., a FOCUS™ emphasis indicator tool 34 as shown in FIGS. 2 and 14). For example, some recreational youth sports programs may emphasize the need for players to have "fun" when participating in the program, while others may emphasize competition as a goal of the program. Still other programs may emphasize player skill development. The emphasis module allows the system provider to provide an emphasis indicator on an arbitrary but uniform scale. The present system is not limited to any particular emphasis module configuration. The emphasis module within a candidate program profile may be initially populated with values based on system collected data. Ratings input from a claimed program and/or a verified end-user may be based on their knowledge/experience with the program. The various inputs are considered by the system and assigned a weighting that collectively reflects the significance of the relevant collected data and inputs.

As stated above, the present system is not limited to any particular emphasis module configuration operable to rate the fun, skill development, and competition emphasis levels of a particular program. A non-limiting exemplary display 34 of an emphasis module is shown in FIG. 2 as a linear scale having a plurality of linearly aligned colored dots (e.g., five dots). Dots of a first color (e.g., green—shown as horizontal lines) may be used to indicate a level of fun emphasis attributable to the program; e.g., a maximum "fun" score would be indicated by all the dots having the color green. Dots of a second color (e.g., yellow—shown as vertical lines) may be used to indicate a level of skill development emphasis attributable to the program; e.g., a maximum "skill" score would be indicated by all the dots having the color yellow. Dots of a third color (e.g., red—shown as curved lines) may be used to indicate a level of competition emphasis attributable to the program; e.g., a maximum "competition" score would be indicated by all the dots having the color red. FIG. 3 shows an example of a legend that may be provided (e.g., by clicking on the "?" icon shown to the right of the display) to explain how information is displayed in the emphasis module. The present system is not limited to the above described embodiment of an emphasis to indicate the fun, skill development, and competition emphasis levels of a particular program.

To encourage responsible and accurate input from end-users and program officials, the system may include attribution measures and/or limit input to particular entities. For example, the system may limit the ability to input into the relative rating mechanism to only "claimed" programs (the term "claimed" defined below) and/or to only end-users (e.g., players or players families) that are verified as being a participant in the program with which they seek to input data. In some embodiments, the system may require those parties inputting data to provide attribute information (e.g., name, email address, etc.) and then store and/or display that attribute information as a means to encourage responsible and accurate input.

Figure 7:
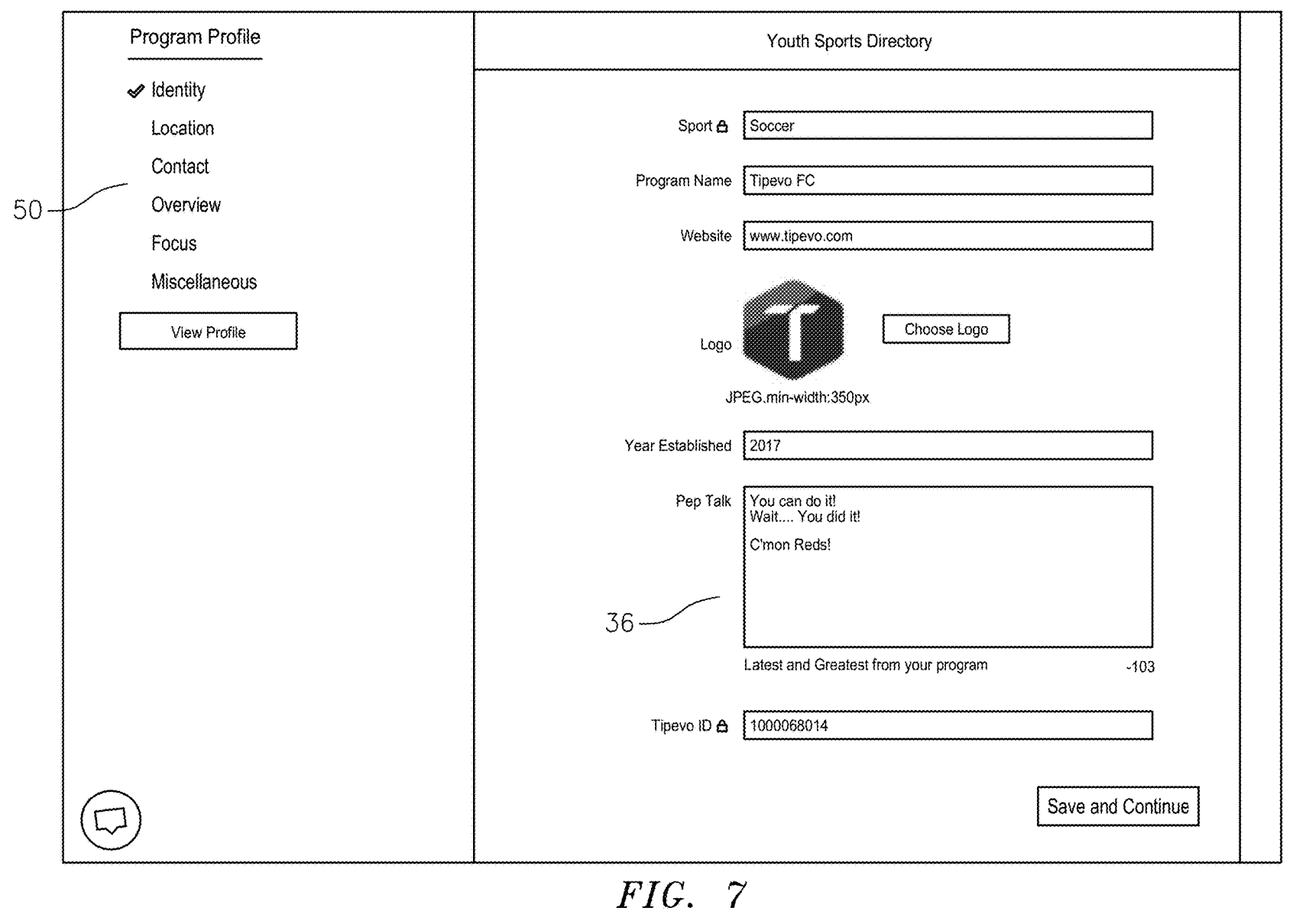

In some embodiments, the system may include a program commentary module, and a commentary box that may be displayed on the summary page of a validated program profile (e.g., a PepTalk™ commentary box 36 as shown in FIGS. 7 and 14) that can be used to provide some program descriptive information (e.g., "About Us", etc.) about the program. The system may initially insert information within the program commentary module (e.g., an "About Us" blurb relating to the program, etc.). Programs that claim their profile may have rights to edit the information provided in the program commentary module; e.g., replace or add to the initially provided information with information such as information relating to their relative rating of the fun, skill development, and competition emphasis levels of the program, or commentary regarding reviews entered on their profile, or the rating of their profile, etc.

The status of a candidate program profile that satisfies the rating threshold may be changed to a "validated program profile", indicating that there is a high level of confidence that the identified youth sports program is in fact an actual youth sports program, and sufficient information has been populated in the profile attribute to make the profile informative and helpful to users. Validated program profiles may be stored and accessible within a Package Library. As stated above, the Package Library storing the program profiles may include one or more servers and/or data storage devices independent of, or the same as, the servers and/or data storage devices storing the candidate profiles and/or the collected data.

Embodiments of the present system may include a "maintenance module" that is configured to periodically trigger new searches for youth sports program data. Validated program profiles can be evaluated in view of newly collected data and updated as appropriate. In some instances, the newly collected data may indicate that a youth sports program represented within a validated program profile has been terminated. In such instances, the program profile can be removed from the system or made inaccessible to end-users. The period of time used for the periodic review cam vary depending on various factors, including the type of sport, the length of the respective sport season, etc.

Embodiments of the present system may include a ratings module 38 (e.g., see FIG. 15), and a ratings indicator 40 that may be displayed on the summary page of a validated program profile (e.g., see ratings indicator as shown in FIGS. 2 and 14). The ratings module may include one or more categories relating to the youth sports program that can be rated; e.g., overall experience, coaches, facilities, transparency, level, enjoyment, etc., and a click button (or other mechanism) that provides a means for the input of ratings data. The ratings may be based on data from one or more sources (preferably multiple sources), including the collected data and ratings entered by viewers of the profile page. The ratings may be indicated by a visual indicator such as a linear scale (e.g., zero to five stars possible). In some embodiments, the ratings module may be configured to restrict the input of ratings data to only those entities that have been assigned rights in the system (e.g., officials of a claimed youth sports program, verified players, verified player family, etc.). For example, the ratings module may be configured so that any system viewer may input ratings data into the "Overall Experience" category, but only entities have rights in the system may input ratings data into the Coaches, Facilities, Transparency, Level, and Enjoyment categories. Restricting ratings input in certain categories may be done to enhance the accuracy of the ratings and to avoid input from entities without personal knowledge.

Embodiments of the present system may include a review module 42 within validated profile pages in editing mode (e.g., see FIGS. 4 and 5), and a review indicator 44 that may be displayed on the summary page of a validated program profile (e.g., see review indicator as shown in FIG. 14). The review module is configured to allow a system end-user to enter written commentary relating to the accessed validated youth sports program profile. As described above, to encourage responsible and accurate input from end-users, the system may include one or more of input attribution measures for comments (e.g., an indication of the identity of the "reviewer"), an indication regarding whether the reviewer is from a claimed program and/or is a verified system user, and a mechanism to flag an inappropriate review. For example, FIG. 4 illustrates an exemplary review module 42 having multiple reviews from "Tom. D", and an indication that "Tom. D" is not verified within the system. In each review shown in FIG. 4 there is also included a flag icon 46. Clicking on the flag icon will cause the system to pop up a menu with one or more "flag" options (e.g., see FIG. 5). The exemplary flag menu shown in FIG. 5 allows a system user wishing to flag a review to indicate that the review is "bad behavior" or "SPAM", or "other". Clicking on the "other" button within the flag menu may allow the person entering the flag to enter their own written commentary relative to the review being flagged. The system operator may, depending on the review, whether it is flagged, etc., delete the review, or take other action as appropriate. The review module and flag menu shown in FIGS. 4 and 5 are non-limiting examples of how the same may be configured.

Embodiments of the present system may include a coaches module, and a coaching level indicator 48 that may be displayed on the summary page of a validated program profile (e.g., see Coaches indicator as shown in FIGS. 2 and 14). Within the coaches module, the system includes a plurality of defined levels, with each level having attributes (relating to the coaches of the program) that define the particular level. Non-limiting examples of parameters that may be considered include minimum age, types of medical certification, minimum years of experience, background check, sport-specific certification, advocacy group certification, system certification (e.g., claimed coach profile), and supplemental designation (e.g. Nutrition, Strength & Conditioning, Speed & Agility), etc. One or more of these parameters (e.g., minimum age) may be required in all levels, and additional ones of these parameters may be required in other levels. A menu detailing the exact parameters for particular levels may be accessed by dropping down a menu (e.g., by clicking on the "type of coaches: qualification tiers" button below the coaching level indicator) to facilitate the user's understanding; e.g., see FIG. 6 for an exemplary embodiment of a coach level menu. The system may initially determine coach qualification levels based on the collected data, and may also consider subjective measures; e.g., reputation in the sport, player and player family feedback, etc. A given program may have coaches at different levels. A program official reviewing the program's profile page may click on the one or more level boxes to indicate that the program includes one or more coaches at the respective level. As can be seen in the summary page of a validated program profile (e.g., see FIG. 14), the coaching level indicator 48 indicates the program has coaches at the Q2, Q4, and Q5 levels. It can be seen, therefore, that the coaches module portion of the system not only provides detailed coach information, but also provides in a standardized manner (e.g., the Tipevo Q™ coach rating system) that facilitates user analysis of the program, and comparative analyses between programs.

The system is structured so that validated program profiles within the Package Library may be accessed by end-users (e.g., youth sports program officials, players, player families, public, etc.). As indicated above, the present system operates within a network environment that includes at least one network application hosting site that is in communication with one or more client nodes (e.g., a computer or a mobile device, such as a cellular telephone, tablet, personal digital assistants, etc.). A client node may execute one or more client applications, such as a web browser, to access and view system content over a computer network. Hence, a person wishing to access the system (e.g., to access profiles) may connect to the system via the Internet, using one or more of a private network, a wireless network, a satellite network, a cellular network, etc.

The ability to review, edit, and input (the subsequent use of the word "input" here will encompass reviewing, editing and inputting new information) data into a validated program profile may be based on assigned rights. For example, a youth sports program that is the subject of a validated program profile may be given the opportunity to "claim" the validated program profile upon payment of a fee and possibly a verification that party representing themselves as speaking for the program does in fact have the authority to represent the program. A program that "claims" its profile will be granted certain rights; e.g., the right to input data into the system for its profile, the right to enter appropriate information pertaining to the program (e.g., in the commentary box, relating to fun, skill, competition, emphases, respond to reviews, respond to ratings, etc.), the right to enter data in restricted categories within a Review Module, access to attribute information that is not present within the validated profile, etc. Another example of an entity that may have the right to input data into a validated program profile, is an end-user (e.g., player, player family, etc.) that is verified as a participant in a given youth sports program. As described above, to encourage responsible and accurate input from end-users and program officials, the system may include input attribution measures.

FIGS. 7-13 illustrate examples of web pages that may be used to represent a validated youth sports program profile in an editing mode. In this example, the youth sports program has indicated they wish to "claim" the profile, but has not yet claimed the profile. FIG. 7 is an "Identity" page of the profile that includes attribute fields including: sport, program name, website, logo, year established, PepTalk™, and Tipevo ID™. The information contained in the sport, program name, website, logo, and year established attribute fields may have been collected and populated into the profile as described above. The logo may be an image that was also collected as described above and populated within the profile. The Tipevo ID field is a program identification number assigned to this particular youth sports program assigned by the system. The PepTalk™ commentary box contains text; e.g., added by the system or by the youth sports program identified in the profile (i.e., Tipevo FC). The right to enter the text shown in the PepTalk™ box was granted to the youth sports program because they claimed the aforesaid profile.

In the event the user representing the youth sports program that is the subject of this profile wishes to edit the information in one or more of the attribute fields, he or she may do so. Upon completion, the user may click on the "Save and Continue" button in the lower right corner to record the edited information. If no changes are made, the Save and Continue button may be clicked on to allow the user to advance to the next page of the profile. On the left hand side of the webpage shown in FIG. 7 is a "Program Profile" Menu 50 that allows the user to click on buttons linked to aspects of the profile; e.g., the Identity page, the Location page, the Contact page, the Overview page, the Focus™ page, and the Miscellaneous page. In FIG. 7, there is a check next to the Identity page button, indicating that the webpage shown as the Identity page has been reviewed, data input were appropriate, and accepted by the program.

Figure 8:
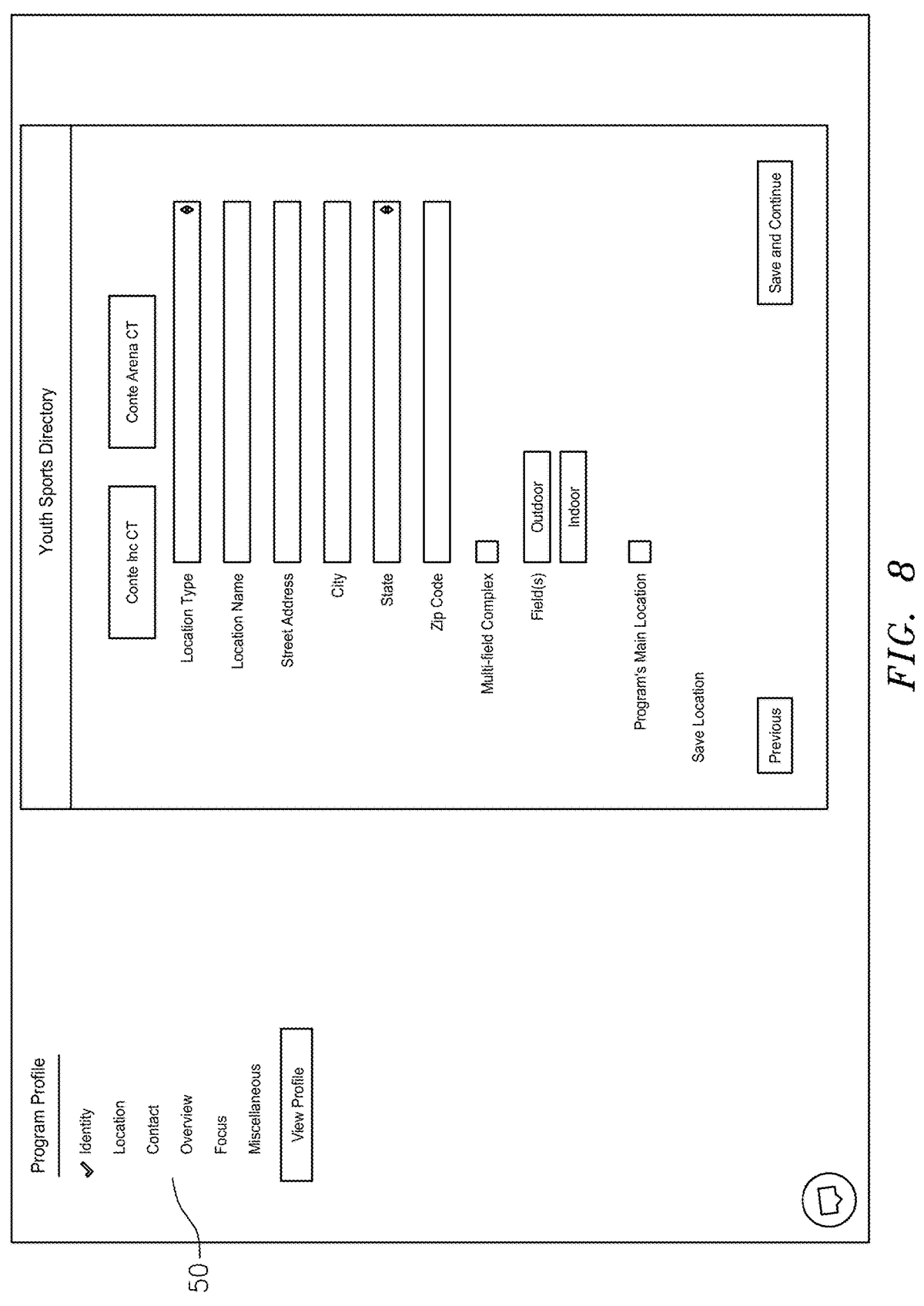

FIG. 8 is a "location page" of the profile that includes attribute fields including: location type, location name, address, multi-field complex, program's main location, etc. In this example page, the location type, location name, address, and program's main location attribute fields are shown as empty, indicating that the respective information was not found during the collection process (or information that was found was deemed to be unreliable). The user may edit the profile by inserting the appropriate data in each of these attribute fields. The multi-field complex attribute field is a box to be checked or ignored as appropriate. The field(s) box allows the user to enter whether the program has an indoor field, an outdoor field, or both. Here again, if the user representing the youth sports program wishes to edit the data in one or more of the attribute fields, he or she may do so. Upon completion, the user may click on the "Save and Continue" button in the lower right corner to record the edited data and to advance to the next page. If no changes are made, the Save and Continue button may be clicked on to allow the user to advance to the next page of the profile.

Figure 9:
FIG. 9 is a Contact page embodiment of a youth sports program profile in an editing mode.

FIG. 9 is a "contact page" of the profile that includes attribute fields including: contact type, contact name, affiliation year (e.g., how many years the contact has been affiliated with the program), contact email address, contact phone number, program's primary contact, and admin access (e.g., indicating the person associated with the program who will have the right to act as the administrator of the profile). For those attribute fields shown as empty, the user may edit the profile by inserting the appropriate information in each of these attribute fields. Upon completion, the user may click on the "Save and Continue" button in the lower right corner to record the edited information and to advance to the next page. Note that the Program Profile shown on the left indicates that the review and editing of the Identity and Location pages of the profile has been completed.

Figure 10:
FIG. 10 is an Overview page embodiment of a youth sports program profile in an editing mode.

FIG. 10 is an "overview page" of the profile that includes an information matrix that allows the user to confirm/edit informational aspects of the program. In this exemplary configuration of an overview page, the information matrix contains/permits the entry of information pertaining to player age and gender, for four different program levels (e.g., Recreational, Travel, Premier, and Academy). The matrix also allows the user to input data regarding whether the program includes an "Outreach" program. In this example, the program is indicated as having a recreational soccer program for 4 year old boys, a recreational soccer program for 4 and 5 year old girls, a travel program for 4-6 year old boys, and a travel program for 4-7 year old girls. Beneath the matrix, there is a slider attribute field 52 that indicates the number of teams participating in the program (the user may adjust the number by sliding the respective cursor).

Figure 11:
FIG. 11 is a continuation of the Overview page embodiment shown in FIG. 10.

FIG. 11 is a continuation of the overview page of the profile. As can be seen, the page includes an expanded "Recreational Box" that depicts attribute fields for Commitment level, Practices per Week, Games per Season, Participation Cost, Participation Fee Types (e.g., Tryout, Tuition, Tournament, and Uniform), Coaches, Enrollment (Open, Tryout, Invitation) and boxes to indicate when enrollment takes place (e.g., in season, end of season, anytime), and Affiliation. The overview page of the profile may include similar expandable boxes for additional program level (e.g., Travel, Premier, and Academy). The attribute field values shown reflect the collected data. The user may edit the profile by adjusting any of the slide positions to reflect the appropriate data value. Upon completion, the user may click on the "Save and Continue" button in the lower right corner to record the edited information and to advance to the next page.

Figure 12:
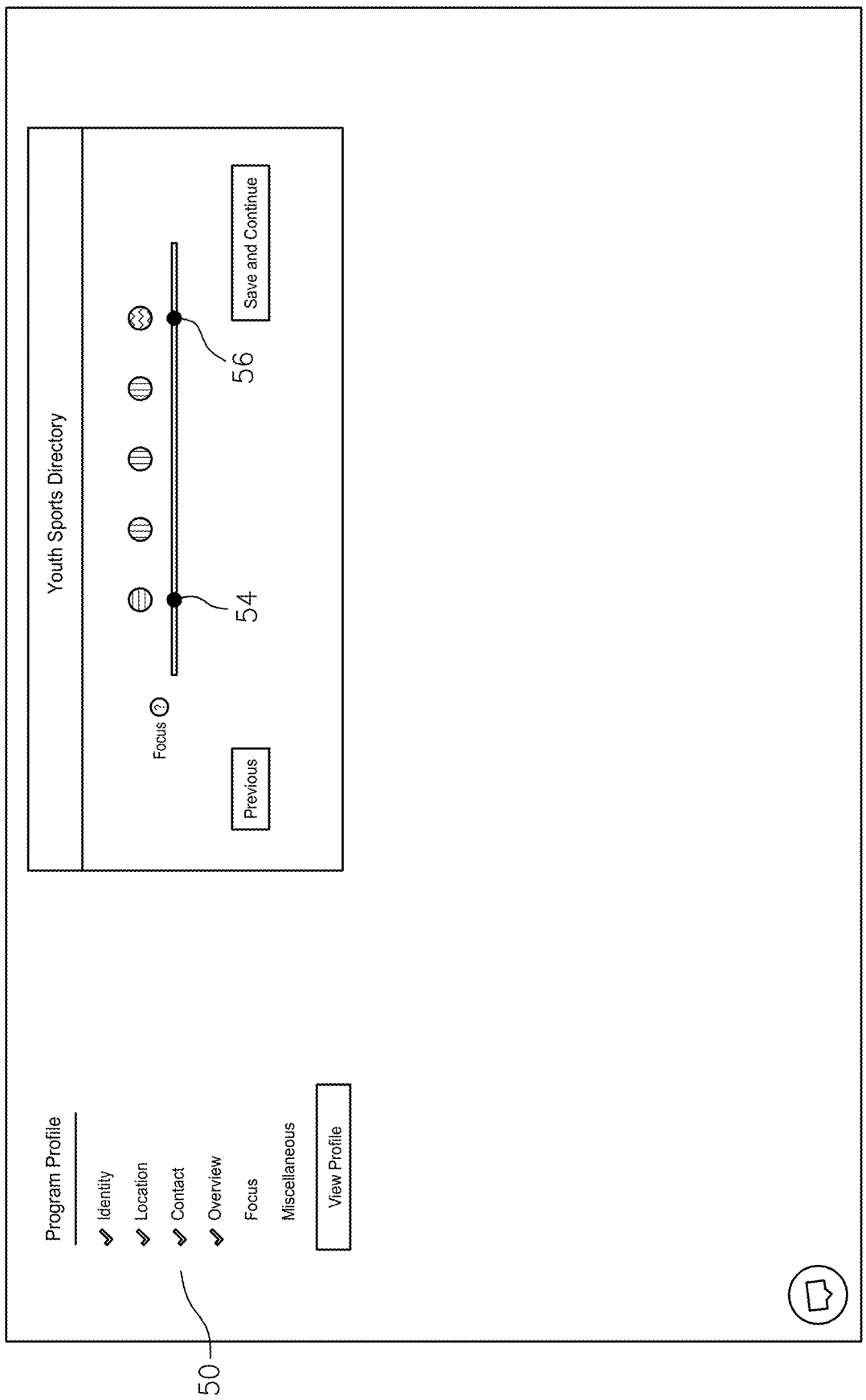
FIG. 12 is an embodiment of an emphasis module page a youth sports program profile in an editing mode.

FIG. 12 is an emphasis module page (e.g., a FOCUS™ emphasis indicator tool) of the profile that includes a mechanism for indicating and editing the emphasis levels of the fun, skill development, and competition within a particular program. The particular non-limiting embodiment of the emphasis module shown in FIG. 12 is described above.

As can be seen in FIG. 12, in this page the emphasis module is provided in a form wherein a user editing the profile can edit the emphasis levels of fun, skill development, and competition of the program. The coloration of the dots (i.e., the number of dots having particular coloration) may be initially set by the system operator based on collected information. In the example shown in FIG. 6, the emphasis module indicator shows one green dot, three yellow dots, and one red dot indicating that the program has a greater emphasis on skill development that fun or competition, and a lesser—but some—emphasis on fun and competition (as indicated above, the color green is identified with horizontal lines, the color yellow is identified with vertical lines, and the color red is identified with curved lines). The emphasis module indicator shown in FIG. 12 includes a first slider 54 disposed on the left and a second slider 56 disposed on the right, each of which can be linearly traversed to manipulate the number of dots having a particular color and therefore the emphasis rating of the program. A system user seeking to input data into the system regarding the fun, skill development, and competition emphasis levels of a particular program may linearly traverse the first and/or second slider 54, 56 to input data. For example, if a user wishes to input data indicating that program has a moderate competition emphasis, that user might slide the second slider to the left. Moving the second slider to the left changes the color of each dot passed by the slider from its initial color to the color red. Hence, an increased number of red dots gives a visual indication of an increased competition emphasis by the program. Similarly, if a user wishes to input data indicating that program has an increased fun emphasis, the user might slide the first slider to the right. Moving the first slider to the right increases the number of green dots, thereby giving a visual indication of an increased fun emphasis by the program. The present system is not limited to the above described emphasis module embodiment, or mechanism for inputting data into the module. Note that the Program Profile shown on the left indicates that the review and editing of the Identity, Location, Contact, and Overview pages of the profile have been completed.

Figure 13:
FIG. 13 is a Miscellaneous page embodiment of a youth sports program profile in an editing mode.

FIG. 13 is a miscellaneous page of the profile that includes attribute fields covering miscellaneous aspects of the program, including: uniform sponsor, league management system, program ID, Facebook address, Instagram address, Twitter address, supplemental programs (e.g., camps, trainings, clinics), on-line store, and philanthropy. In a manner similar to that described above, the user may edit the aforesaid attribute fields by entering data, checking a box, clicking a button etc.

In the example profile input pages shown in FIGS. 7-13, FIG. 13 represents the last review page of the profile in editing mode. At this point, the user may confirm the populated data (which data was either initially populated from the collected data, or entered by the user) by clicking on the "Save and Claim" button. The data contained within the user validated profile is saved into the system where it can be accessed by the system operator, but may not yet be entered into the validated profile page disposed within the Package Library. The system may perform a review of the edited data to check for accuracy, anomalies, etc. Once the user validated page is approved by the system, it will be accepted into the validated profile page.

Figure 15:
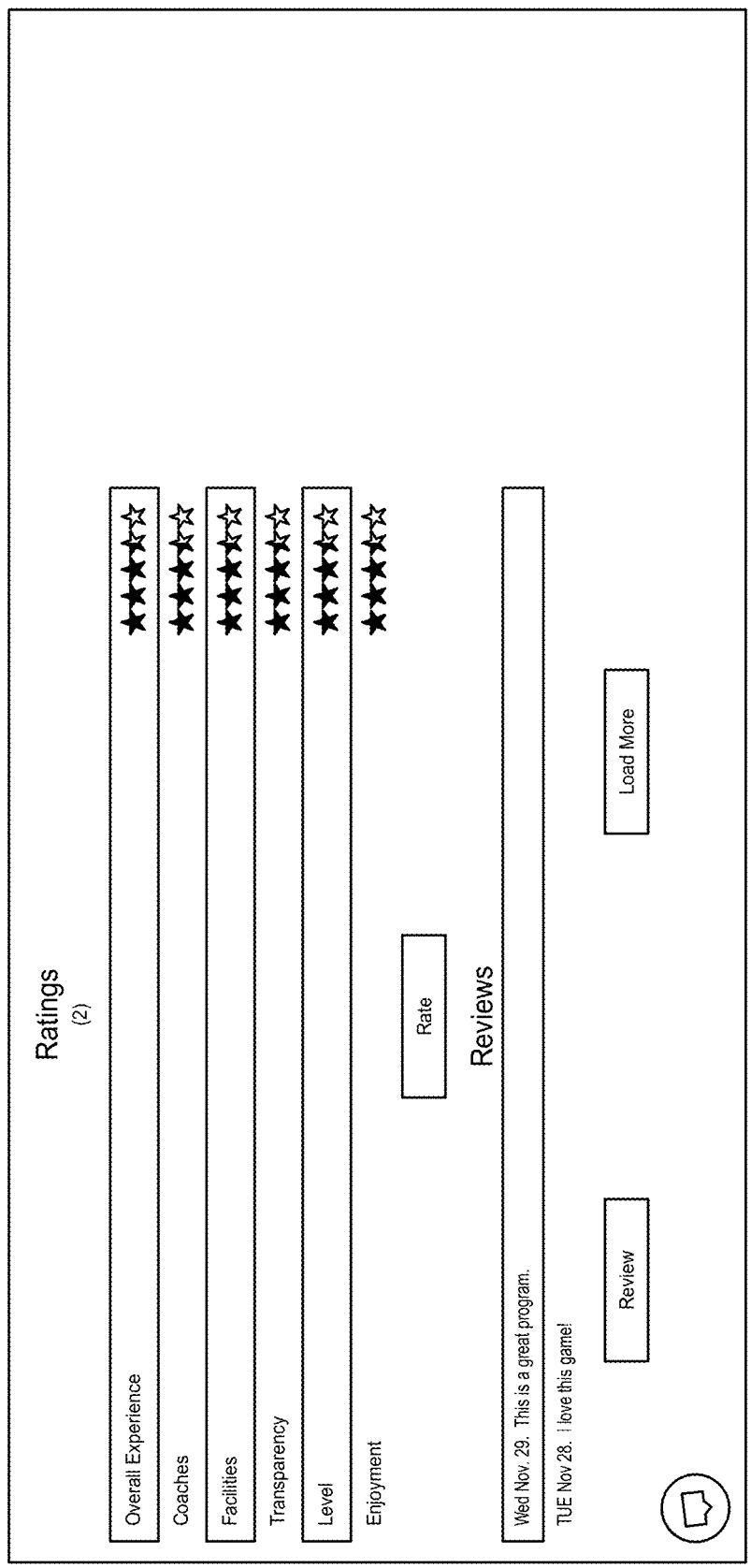
FIG. 15 is a continuation of the profile summary page shown in FIG. 14.

As indicated above, the editing mode webpages shown in FIGS. 7-13 illustrate examples of profile web pages that may be accessed by a youth sports program that has claimed their profile. Once the profile page has been edited and confirmed by the user, and accepted as a validated profile page by the system, the contents of the validated profile page may be used to create a profile summary page as shown in FIGS. 14 and 15. Alternatively, if a program has not claimed its profile page, a system validated profile page containing program data from the collection process may be used to populate a profile summary page as shown in FIGS. 14 and 15.

FIGS. 14 and 15 represent a profile summary page that is available to the public, regardless of whether the viewer accessing the system site is a youth sports program participant, a youth sports program, etc. The summary page includes a number of data fields that can be seen and easily understood by the viewer. The summary page format is specifically selected to provide a consistent format that contains information presented in a standardized manner that will facilitate an analysis of an individual program, as well as comparative analyses between similar youth sports programs, etc. The exemplary summary page shown in FIGS. 14 and 15 also includes a "Review" button and a "Rate" that permit a viewer to access a portion of the system (e.g., see the above descriptions of the review module and the rating module) to enter information regarding the featured program, and a commentary box (e.g., a PepTalk™ commentary box 36) that permits "claimed" programs to enter information and responses to viewer comments. As described above, to encourage responsible and accurate input from end-users and program officials, the system may include input attribution measures for comments and may include filtering to eliminate inappropriate commentary. FIG. 15 shows a continuation portion of the profile summary page that includes a ratings portion that includes ratings for categories such as Overall Experience, Coaches, Facilities, Transparency, Level, and Enjoyment, as is described above.

Figure 16:
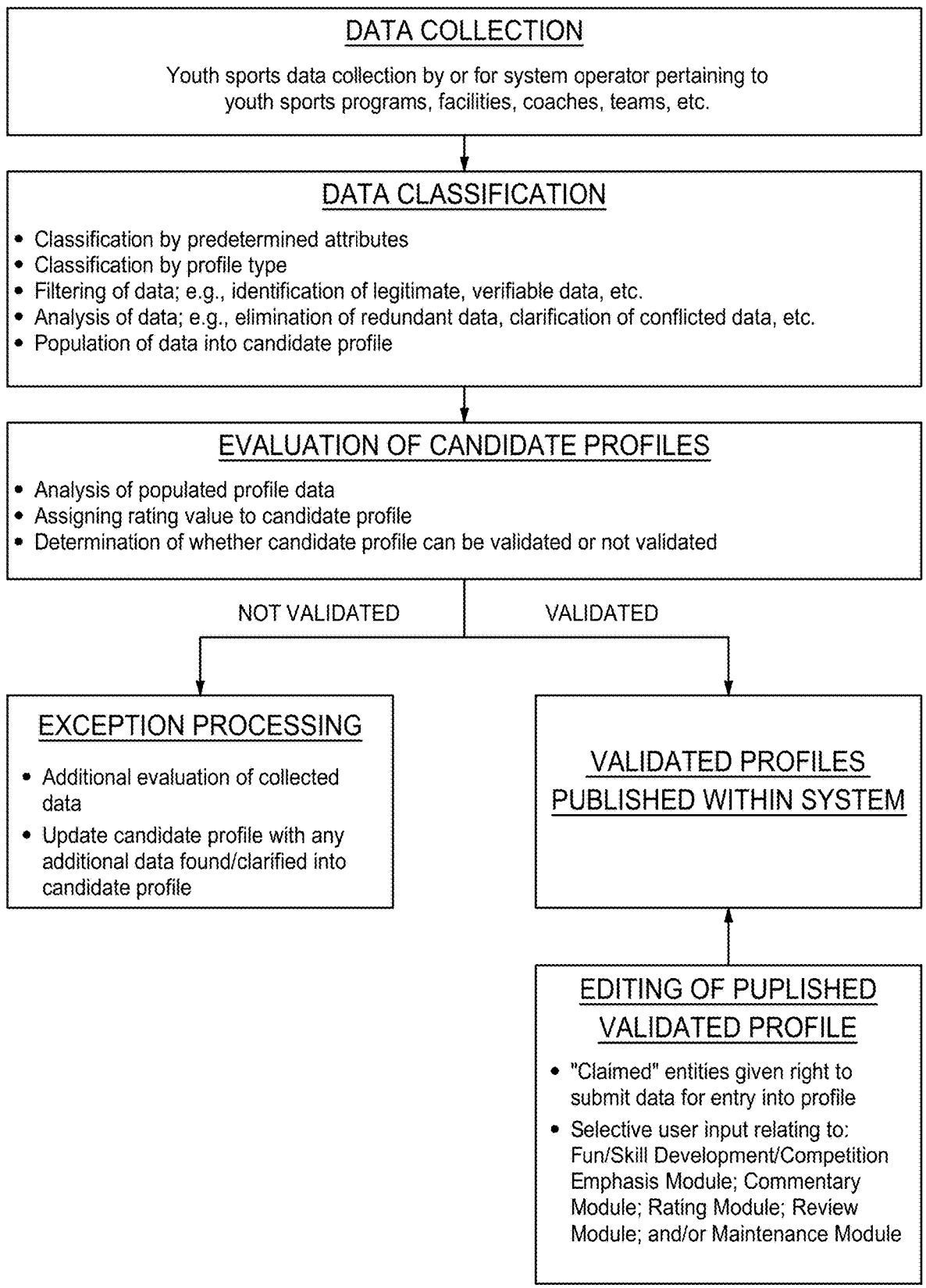
FIG. 16 is a flow chart showing an embodiment of a methodology according to the present disclosure.

As indicated above, the present disclosure includes systems and methodologies for cataloging youth sports programs (e.g., in a manner that allows for standardization, program analysis, comparative program analysis, etc.) The flow chart shown in FIG. 16 illustrates aspects of the methodology associated with the present system. As an initial step in the method aspects, the present disclosure includes extensive collection of data relating to youth sports, typically from a variety of different sources. The data collection process 58 is performed by or on behalf of the system operator without input from youth sports programs. The independent collection of data typically from a variety of different sources gives the system, and the profiles that it produces, a desirable level of integrity and verification. As described above, end-users of the system have some ability to input data to the system, which input can increase the accuracy and completeness of the profile information. The system, however, permits the system operator to verify end-user submitted data (e.g., check it against existing collected data or newly collected data) before it appears in a validated profile summary page. This practice provides additional integrity to the system and the profiles it produces.

The data classification step 60 enables the present system to discover youth sports programs independent of input from such youth sports programs. Importantly, the classification process also filters and analyzes data, which also adds to the integrity of the system and the profiles it produces.

The evaluation of candidate profiles step 62 enables the present system to identify youth sports programs from the collected data (independent of input from such youth sports programs) with a high degree of confidence. If the evaluation determines that a candidate profile does not meets certain predetermined validation criteria (which may vary depending on the type of profile, sport, etc.), the candidate profile may be subjected to an exception processing step 64. In the exception processing step 64, the candidate profile may be updated with collected data (existing or newly acquired) and the updated candidate profile may be subjected to the evaluation process again. If the evaluation determines that a candidate profile does meet certain predetermined validation criteria (which may vary depending on the type of profile, sport, etc.), the candidate profile may be validated and published within the system (e.g., made available to the public via the system website, etc.) as a profile summary page.

Once a validated profile summary page is published, the profile (e.g., the data contained within the profile) may be edited or updated not only by the system operator, but also by outside parties; e.g., claimed youth sports program officials, verified players, verified player families, etc. (e.g., Editing step 66) In addition, users of the system neither claimed nor verified may have some limited ability to input data relating to particular profiles. As a result, the respective profiles are produced with accurate, standardized data relating to the program or other aspect of youth sports, and are maintained to ensure accurate and up to date information. The present system and methodologies is also such that profiles (and other directory entries that may be offered) may be accessible to the public via a public website; e.g., access is not contingent on a user fee or paid membership.

What is claimed is:

1. A method of cataloging youth sport programs, comprising:
    collecting youth sport program data, which collecting includes automated electronic searching of a plurality of different data sources on the Internet for the youth sport program data;
    storing the collected youth sport program data in at least one data storage device;
    analyzing the collected and stored youth sport program data to identify a plurality of youth sport programs, said analyzing including:
        classifying the collected youth sport program data, the classifying including filtering and analyzing the collected data to determine a subset of related youth sport program data;
        verifying the respective youth sport program using the subset of related youth sport program data;
    producing a validated youth sport program profile for at least some verified youth sport programs, the validated youth sport program profile including a plurality of program specific parameters for the respective verified youth sport program, the program specific parameters including one or more of a current name of the youth sport program, a sport type of the youth sport program, a location of the youth sport program, or one or more contact data for the youth sport program; and
    publishing the one or more validated youth sport program profiles in a web-based application accessible over the Internet.

2. The method of claim 1, wherein the step of producing a validated youth sport program profile includes validating the youth sports program based on predetermined criteria.

3. The method of claim 1, wherein the step of publishing the one or more validated profiles in a web-based application includes publishing a plurality of validated profiles, each validated profile having a different youth sport program sport type.

4. The method of claim 3, wherein the analyzing step includes determining a value for each of a plurality of standardized parameters for the respective verified youth sport program.

5. The method of claim 4, wherein the plurality of standardized parameters includes one or more of a coaches rating parameter, a youth sport program focus parameter representative of respective emphasis levels of player participation fun, player skill development, and competition for the identified youth sport program, or a youth sport program rating parameter.

6. A method of cataloging youth sport programs, comprising:
collecting youth sport program data, which collecting includes automated electronic searching of the Internet for the youth sport program data, and storing the collected youth sport program data in at least one data storage device;
analyzing the collected youth sport program data to identify a plurality of youth sport programs, the identification of each said youth sport program including determining a plurality of program specific parameters for the respective youth sport program, the program specific parameters including one or more of a current name of the youth sport program, a sport type of the youth sport program, a location of the youth sport program, or one or more contact data for the youth sport program;
analyzing the collected data associated with the identified youth sport program to determine a value for each of a plurality of standardized parameters for the identified youth sport program;
populating a youth sport program profile for each identified youth sport program with the plurality of program specific parameters for that said youth sport program and the respective value for each of the plurality of standardized parameters for that said youth sport program; and
publishing the populated youth sport program profiles in a web-based application accessible over the Internet.

7. The method of claim 6, wherein the plurality of standardized parameters for the identified youth sport program includes a standardized coaches parameter.

8. The method of claim 7, wherein the value for the standardized coaches parameter is based on at least one of a plurality of coach parameters, the plurality of coach parameters including a minimum age of a coach identified with the youth sport program, a medical certification of the coach, a coaching experience value for the coach representative of an amount of time the coach has coached the youth sport program sport type, a playing experience value for the coach representative of an amount of time the coach has played the youth sport program sport type, a coaching certification of the coach for the youth sport program sport type, and a background check of the coach.

9. The method of claim 8, wherein the value for the standardized coaches parameter is based on a plurality of predetermined levels for the coach identified with the youth sport program.

10. The method of claim 9, wherein the predetermined levels include:

a first level based on at least one of the plurality of coach parameters;
a second level based on at least two of the plurality of coach parameters;
a third level based on at least three of the plurality of coach parameters; and
a fourth level based on at least four of the plurality of coach parameters.

11. The method of claim 10, wherein the at least one of the plurality of coach parameters for the first level is a first minimum age of the coach identified with the youth sport program, and the at least four of the plurality of coach parameters for the fourth level includes a second minimum age of the coach identified with the youth sport program, and the second minimum age is greater than the first minimum age.

12. The method of claim 10, wherein the at least two of the plurality of coach parameters for the second level includes a first coaching experience value for the coach representative of an amount of time the coach has coached the youth sport program sport type, and the at least four of the plurality of coach parameters for the fourth level includes a second coaching experience value for the coach representative of an amount of time the coach has coached the youth sport program sport type, and the second coaching experience value is greater than the first coaching experience value.

13. The method of claim 6, wherein the plurality of standardized parameters for the identified youth sport program includes a youth sport program focus parameter representative of respective emphasis levels of player participation fun, player skill development, and competition for the identified youth sport program.

14. The method of claim 6, wherein the plurality of standardized parameters for the identified youth sport program includes at least one of a cost to participate in the identified youth sport program, or a size of the identified youth sport program, the size being representative of a number of teams in the identified youth sport program.

15. The method of claim 6, wherein the step of publishing the populated youth sport program profiles in the web-based application includes publishing a plurality of populated youth sport program profiles having different youth sport program sport types from one another.

16. The method of claim 15, wherein the plurality of standardized parameters for each identified youth sport program includes a standardized coaches parameter, and the standardized coaches parameter for each identified youth sport program is in a standardized format that is substantially the same for each different youth sport program sport type.

17. The method of claim 15, wherein the plurality of standardized parameters for each identified youth sport program includes a youth sport program focus parameter representative of respective emphasis levels of player participation fun, player skill development, and competition for the identified youth sport program, and the youth sport program focus parameter for each identified youth sport program is in a standardized format that is substantially the same for each different youth sport program sport type.

18. The method of claim 15, wherein the step of publishing the plurality of populated youth sport program profiles includes grouping regionally related youth sport program profiles.

19. The method of claim 18, wherein the grouping of regionally related youth sport program profiles includes youth sport programs having different youth sport program sport types.

20. The method of claim 6, wherein the plurality of standardized parameters for the identified youth sport program includes a youth sport program rating parameter.

* * * * *